United States Patent [19]

Metcalfe et al.

[11] 4,063,220
[45] Dec. 13, 1977

[54] MULTIPOINT DATA COMMUNICATION SYSTEM WITH COLLISION DETECTION

[75] Inventors: Robert M. Metcalfe, Woodside; David R. Boggs; Charles P. Thacker, both of Palo Alto; Butler W. Lampson, Portola Valley, all of Calif.

[73] Assignee: Xerox Corporation, Stamford, Conn.

[21] Appl. No.: 563,741

[22] Filed: Mar. 31, 1975

[51] Int. Cl.² .............................................. H04Q 9/00
[52] U.S. Cl. ........................... 340/147 LP; 178/58 A; 340/147 R; 340/163; 340/346
[58] Field of Search ............. 340/147 R, 147 LP, 163, 340/151, 152 R, 152 T, 346; 325/22, 57; 178/58 A; 179/2 DP, 15 AS, 17 B, 30; 343/177, 180

[56] References Cited

U.S. PATENT DOCUMENTS

| 3,350,687 | 10/1967 | Gabrielson et al | 340/163 |
|---|---|---|---|
| 3,496,293 | 2/1970 | Avery et al. | 340/346 |
| 3,509,538 | 4/1970 | Holden et al. | 340/147 R |
| 3,725,870 | 4/1973 | Felcheck | 340/152 R |
| 3,742,450 | 6/1973 | Weller | 340/147 R |
| 3,745,462 | 7/1973 | Trimble | 325/22 |
| 3,819,932 | 6/1974 | Auer et al. | 340/163 |
| 3,825,897 | 7/1974 | Lawton | 340/147 R |
| 3,942,116 | 3/1976 | Ferguson | 325/22 |
| 3,967,059 | 6/1976 | Moore et al. | 178/58 A |

FOREIGN PATENT DOCUMENTS

| 1,168,476 | 10/1969 | United Kingdom. |
|---|---|---|
| 1,365,838 | 9/1974 | United Kingdom. |
| 1,382,133 | 1/1975 | United Kingdom. |

*Primary Examiner*—John W. Caldwell, Sr.
*Assistant Examiner*—James J. Groody
*Attorney, Agent, or Firm*—J. E. Beck; T. J. Anderson; B. P. Smith

[57] ABSTRACT

Apparatus for enabling communications between two or more data processing stations comprising a communication cable arranged in branched segments including taps distributed thereover. Tied to each tap is a transceiver which on the other side connects to an associated interface stage. Each transceiver includes, in addition to the usual transmitter and receiver sections, a gate which compares the data from the interface stage with the data on the cable and indicates whether such are equal. Should such be unequal, an interference between the transceiver and the cable is indicated, disabling the associated transmitter section. Each interface stage tied to such transceiver also includes an input and an output buffer on the other end thereof interfacing with a using device, such input and output buffers storing both the incoming and outgoing data. The output buffer is connected to a clock-driven shift register which converts the buffered data to a serial stream, feeds such data to a phase encoder, which then connects to the transmitter or driver section of the transceiver. The input buffer is loaded by an input shift register which derives its clock from a phase decoder, the shift register and the phase decoder both connecting to the receiver section. When the station is to start transmitting, the phase decoder detects the presence of other transmissions on the cable and detains the output shift register until no other transmissions are sensed. Once a transmission has begun, if interference is detected and the transmitter section is disabled, a random number generator is used to select an interval of time at the completion of which the next attempted transmission will take place. Concurrently, a counter counts the number of interferences, or collisions, which recur in the attempted transmissions of one data packet and weights the mean of the random number generator accordingly. The input shift register is also connected to an address decoder which enables data transfer to the input buffer only during those times when the data is preceded by an appropriate address.

22 Claims, 7 Drawing Figures

MULTIPOINT DATA COMMUNICATION SYSTEM WITH COLLISION DETECTION

BACKGROUND OF THE INVENTION

1. Field of the Invention

The present invention relates to data communication systems, and more particularly to data communication systems which are based on data packet switching.

2. Description of the Prior Art

In the prior art, communication systems were added to computers to allow various remotely located users access to the computer. As computer processing times became faster, the need for allowing more users access to the computer further increased, in order to fully utilize the computer facility. Generally, access to such central computer was made by way of remote consoles, each tying to the central computer. As the number of computer facilities grew, users began to notice their heavier investments in software, and the often occurring duplication of software, and for those reasons communications among users increased to facilitate sharing of programs and data.

As the facility of using computers for problem solutions increased, the solutions themselves became more ambitious, increasingly complex and quickly increased in size to a point where the local computer could not economically handle such. This situation led to an additional use for data communication where various computing devices were combined to provide enhanced virtual computers.

In conjunction with the above developments, parallel advances in semiconductor technology have provided small, inexpensive computers, such as microprocessors, which because of their low cost have acquired a wide acceptance. The owner of such a small computer, however, often does not desire to concurrently assume the cost of various peripheral devices, as for example a high speed printing station, and for that reason such devices are increasingly used on a shared basis. Again, the necessity of communicating between the small computer and the shared facility increased the load on any communicating system. In addition, with the advent of such small computers, and particularly their associated algorithmic simplicity and convenience in use, the old techniques of central computer process supervision are now being abandoned in favor of distributed control.

More specifically, the original large and complex computer facilities were generally provided with a supervisory system for the purpose of scheduling and directing jobs, sampling input and output devices and otherwise controlling the order of operations within a relatively complex computer. Such supervisory systems also accommodated, by way of the loader function and the linking function for example, problem solutions which in their entirety would saturate the computer memory and which, however, by use of this system, could be broken up and handled serially on one central processing facility. Such tasks assigned to the supervisory system, together with the increasing task of tying and correlating various, increasing in number, peripheral stations to the central processor has led to a growth of supervisory systems which are now typically so complex that a large part of the computer down time can be attributed to failures thereof. Accordingly, the recent trend has been towards less centralized control in any one computer facility.

With the advent of the aforementioned small computers, and particularly their ease and simplicity in operation, the user himself can assume more control over the sequence of operations in the processor. Accordingly, a central supervising system is no longer required and the control is therefore shared, or distributed, amongst users.

The residual problem, however, is in the communications themselves between the various computing devices. Where more than one computer is shared in solving a particular problem, or where smaller problems are handled on a time shared basis, the speed of communication and the capacity of the communicating network quickly becomes the dominant aspect of the problem.

Communications between such computing devices are carried out by way of two generic techniques. One such technique is generally referred to as a circuit switching technique, while the second technique is generally referred to as a packet switching technique. Circuit switching techniques can be analogized to telephone network switching, which for short and bursty communications typical in computer applications requires a high overhead in terms of circuit equipment. For a short communication, the time required to establish the connection can be very large relative to the time of actual transmission. For bursty communications, the connection established by circuit switching is unused and wasted during the large fraction of idle time in the data conversation. On the other hand, packet switching can be analogized to letter handling by the postal system, except that the letters are computer data packets sorted and transmitted very quickly by increasingly inexpensive computers. Short communications can be carried efficiently in a single data packet and bursty communications can be handled with a series of packets, none of which occupy communication resources during the frequent idle periods between bursts.

Accordingly, there exists a present requirement for a packet switching communication system which is efficient and reliable while requiring minimum hardware. Additional requirements are to provide a communication system capable of effecting communications between various computers and peripherals without the aid of central control and with a high level of probability of completion. In addition, there is a further requirement to provide a communication network which is simple to produce, requires simple parts in its attachments and is generally of low complexity.

SUMMARY OF THE INVENTION

Briefly, the above and other requirements are met within the present invention by providing a bit-serial receiver-transmitter network continuously connected to all communicating devices. More specifically, such is accomplished by forming a network of any one or a plurality of transmitting media, such as coaxial cable, optical fiber or others, connected together into one branched network by constantly active devices, like repeaters, by which communications necessarily adapted to one medium are translated into the other medium.

The above communication network is constantly tied across a plurality of transceivers and associated interface stages to a plurality of using devices, such devices being either various general purpose computers, special purpose computers (microprocessors), devices like input-output stations, or remote terminals, and various other peripherals. The common characteristic of each transceiver and interface stage combination is that it constantly senses the data stream passing through the network, the interface stage constantly looking for data packets addressed to it. The sensing is accomplished by a receiver included in the transceiver associated with each interface stage, connecting the interface stage to the network. In addition to the normal transmitting and receiving functions, the transceiver provides a further control function for blocking transmission of data packets from the using device, in a self-controlled manner, to avoid interference or collision with data on the cable passing between two other using devices. When a period of quiscent state in the cable is sensed by the transceiver and communicated to the interface stage, the interface stage issues a transmission and, if after a predetermined interval of time no collisions are detected, that interface stage acquires the network and all other using devices, by way of their interface stages, will defer in the same manner.

Because of propagation delays, however, one remote station may be already transmitting into the cable while another still senses a quiscent cable. Thus, essentially concurrent attempts at transmission by two or more using devices may occur with resulting data collision. This particular contingency is accommodated by incorporating within each transceiver collision detection logic which, concurrent with the transmission, also monitors the cable, compares the cable contents bit by bit against the locally transmitted contents, and if differences or collisions are discovered, directs the interface stage to abort the transmission. Once such occurs, both conflicting sending devices abort the transmission and will not retransmit unil each one waits for a predetermined interval of time. In order to preclude simultaneous restarts, and therefore repeated collisions, additional logic is provided by which the above increment of time, or retransmission interval, in each interface stage is distributed according to a weighted random number generator. The weighting of the number from the random number generator is performed by further logic elements which, based on the past number of repeated aborts for the packet selected for present transmission, determines a heavier present usage density of the communicating network and therefore weights the random number to a larger mean time interval.

By way of the above summary, a communication system is described comprising the elemental blocks of a transceiver incorporating an interference or collision detector, an interface stage including an address filter tied to an input shift register which also includes at its input a phase decoder. The address filter identifies the particular address assigned to any one station. In addition, a collision counter tied to the collision detector of the transceiver is provided for counting up the number of collisions for each new packet, the count from the collision counter being used as a weighting function for each number generated by a random number generator. The weighted numbers so developed are then fed to a clock-driven counter to set a time interval for retransmission.

The network itself comprises sections of a coaxial cable. Since generally coaxial cable includes various line losses, and since segments thereof may extend over large geographic ranges, various coax losses occur, and for that reason sections of the coax cable network are tied across repeaters.

Reference to repeaters in this disclosure is only for purposes of completing the embodiment and are not necessary to practice the invention where short communication links are contemplated and line losses are taken out by selective design of the cable and the transceiver.

Distributed along the communicating cable network are a plurality of stations, each including a using device generally categorized as either a computer, an auxiliary memory, or an input-output terminal. Each using device, whether it be a computer or a remote terminal, is tied to the coaxial cable by way of a T-connector, or tap, connecting to a transceiver in series with an interface stage which in turn connects to the using device. The transceiver is conventional, including a transmitter or driver section, and a receiver section. In addition, the transceiver is modified to include a circuit connecting the output of the driver across a delay to an input of an exclusive OR gate which at the other input receives the output of the receiver section. The output of the exclusive OR gate indicates interference and is connected to enable an output shift register which in turn controls an output buffer tied to the output terminals of the using device. In addition to the input from the exclusive OR gate, the output shift register also receives a station control signal.

The data outputs of the output buffer are connected in parallel to the input terminals of the output shift register which is clocked by a transmitter clock to transfer serially into a phase, or data-clock, encoder. The data-clock encoder in turn outputs by way of a serial data stream to the driver section of the transceiver.

On the input side, the transceiver feeds to a phase, or data-clock, decoder. The data-clock decoder conventionally supplies a stream of serial data to an input shift register and also provides the clock input therefor. The input shift register furthermore feeds, in parallel, selected bit positions thereof to an address filtering network which identifies an address code at the front of the data packets received to enable the transfer of the rest of the selected packets to an input buffer which in turn is connected to the input terminals of the using device.

Further included within the interface stage is a restart circuit comprising a continuous running clock counter having the outputs thereof connected in a Boolean AND to the outputs of a collision shift register. Since the continuous running clock counter is essentially independent of any of the internal clocks of the using devices, and since any data packet transmission attempt depends on the internal clock of the using device, an asynchronous, or essentially random, relationship is formed by way of the above combination of the clock counter and the incidents of collision. This relationship is weighted by the collision count shifted into the collision shift register. In this manner a collision count weighted random number generator is essentially formed which in turn controls, through an up-down counter, the output shift register for transmission restart.

By way of the foregoing general summary, a system is described which by virtue of its arrangement of parts reduces the incidence of collisions between transmitted data packets to a low level of probability.

The objects and advantages of the present invention will become apparent from a consideration of the following detailed description when taken in conjunction with the accompanying drawings.

DESCRIPTION OF THE SPECIFIC EMBODIMENTS

In an effort to deliver the inventive concept herein with the least amount of ambiguity, a set of definitions is initially set forth as follows:

The communication medium illustrated herein by way of an arrangement of coaxial cables is a logically passive serial data transmission medium, or a single channel medium, generically referred to hereinafter as a cable.

A plurality of communicating data processing devices, such as general purpose computers, microprocessors, and remote consoles are generically referred to hereinafter as using devices.

Each using device is tied across an interface stage to a transceiver stage, the combination of the transceiver, the interface stage, and the using device being hereinafter referred to as a station.

The transceiver connects to the cable by way of a coax T-connector hereinafter referred to as a tap.

Each tap is totally passive and the selection of the receiving station, or the data path established between two communicating stations, is by way of an address rather than network switching, hereinafter referred to as address filtering.

Thus, a sending station broadcasts and receives digital signals in serial stream carried on the cable, such digital signals including an address, each set of signals associated with a particular address being hereinafter referred to as a data packet.

In order to avoid interfering with the data sent to other stations, each station is provided with an interface stage and a transceiver stage which, amongst other functions, determine whether the cable is presently occupied by other data and wait for the cable to become silent before transmission is initiated, this function of the interface and transceiver stages being hereinafter referred to as deference.

When the cable is found to be silent and a station therefore begins transmitting a data packet onto the cable, all other stations defer and the status of the transmitting interface stage is hereinafter referred to as acquisition.

In instances where an interference is detected by the sending transceiver with transmissions sent by other stations, a data interference state is determined, such state being hereinafter referred to as a data packet collision.

Upon the occurrence of a packet collision, the transmission into the cable is terminated by the station and is rescheduled for some randomly chosen later time, hereinafter referred to as randomized retransmission.

Since the attempt at retransmission is dependent on the presently existing usage of the cable by other stations, each interface stage includes additional logic by which recent packet collision history is remembered for each packet to be transmitted and is utilized to weight the randomized retransmission to intervals weighted according to the cable usage rate, such weighting being hereinafter referred to as statistical coordination.

SYSTEM DESCRIPTION

Figure 1:
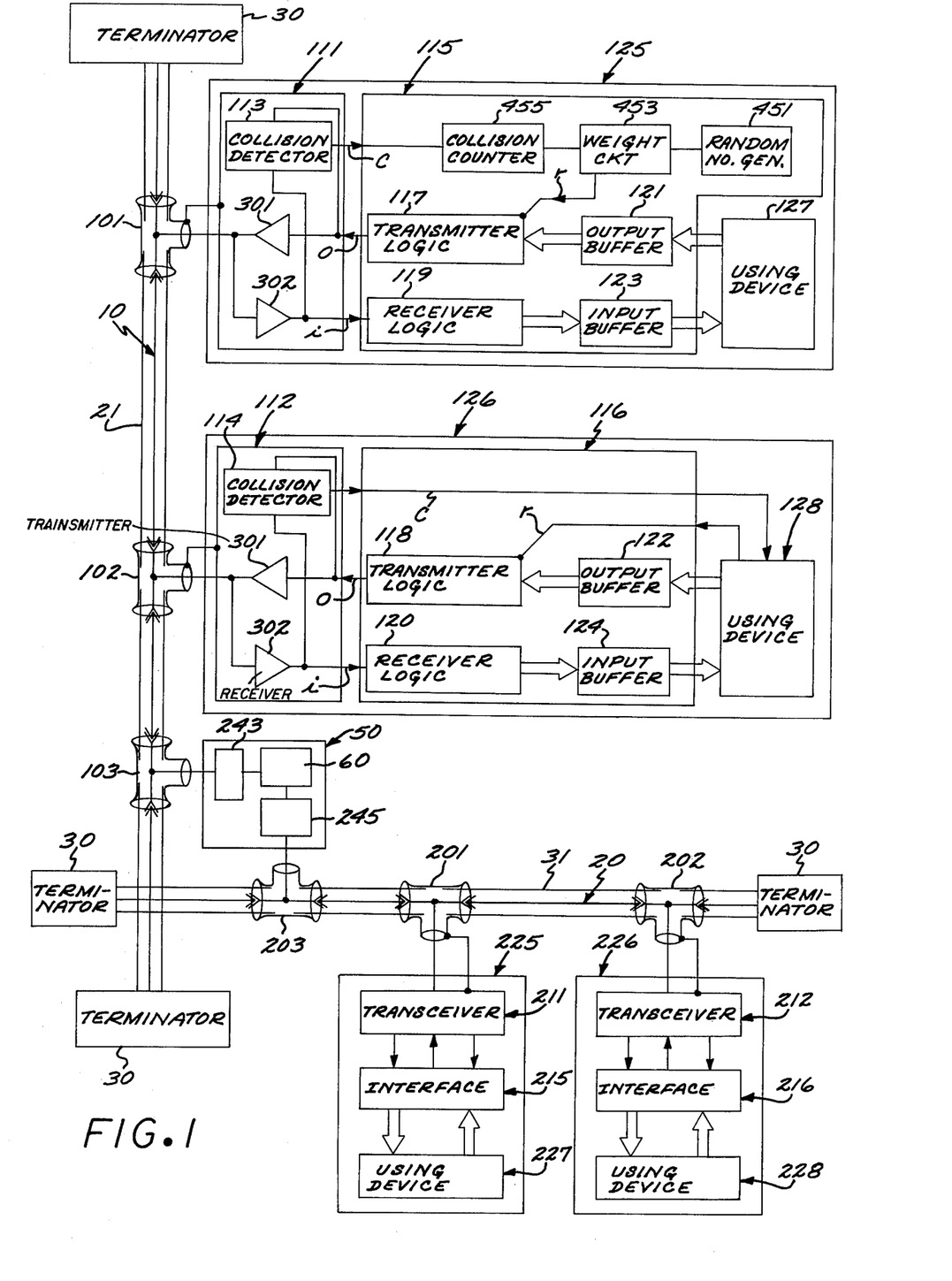
FIG. 1 is a generalized diagram of a communication system constructed according to the present invention.

As shown in FIG. 1, the communicating network is illustrated by way of two intersecting cables, respectively designated by the numerals 10 and 20. Cables 10 and 20 are isolated relative each other, each cable terminating at either end in a terminator designated by the numeral 30. For purposes of illustrating this invention, cables 10 and 20 are conventional high frequency coaxial cables and terminators 30 are therefore conventional impedance matching devices, such as resistors, selected to limit reflections. Surrounding cables 10 and 20 are shields 21 and 31, commonly tied to a single ground to avoid ground loops. Distributed along cable 10 are a plurality of taps shown as conventional T-connectors 101 and 102. Tap 101 connects both at the shield and the center lead to a transceiver 111, the center lead connecting both to the output of a driver 301 and a receiver 302. The transceiver 111 forms the front end of a station 125, transceiver 111 connecting at the other side by an input signal lead "i" from receiver 302 and an output signal lead "o" to driver 301 with an interface stage 115. Within the transceiver 111, leads "i" and "o" are further branched off to a collision detector 113. Within the interface stage 115, leads "o" and "i" respectively connect to a transmitter logic stage 117 and receiver logic stage 119, which are, in turn, respectively connected on the other end to an output buffer 121 and an input buffer 123. Buffers 121 and 123 on the other side connect to the output and input terminals of a using device 127. Using device 127, interface stage 115 and transceiver 111 thus comprise the communicating station 125.

In addition to the above structure, interface stage 115 includes a random number generator 451 which outputs to a weighting circuit 453, weighting circuit 453 also receiving the output of a collision counter 455 receiving at the input thereof an output signal "c" from the collision detector 113. The output signal, shown as signal "r", from the weighting circuit 453 is in turn connected to the enable terminal of the transmitter stage 117.

In a like manner, tap 102 ties across a similarly constructed transceiver 112 to an interface stage 116, transceiver 112 similarly including, connected between signal leads "i" and "o", a collision detector 114, leads "i" and "o" similarly passing to the interior of the interface stage 116 to respectively connect to a receiver logic stage 120 and a transmitter logic stage 118. Receiver and transmitter stages 120 and 118 then connect across an input buffer 124 and an output buffer 122 to the respective input and output connections of yet another using device 128. Again, transceiver 112, interface stage 116 and using device 128 comprise a communicating station 126.

In station 126, the functions of the random number generator, collision counter and weighting circuit are all performed within the using device 128 by a method described hereinbelow. Thus, device 128 is shown providing the signal lead "r" to the enabling terminals of the transmitter logic stage 118 and further receiving the signal lead "c" from the collision detector 114.

Cable 20 is similarly shown communicating with a plurality of stations, illustrated again by way of two stations 225 and 226 which include corresponding, similarly constructed interface circuits 215 and 216 between using devices 227 and 228 and respective transceivers 211 and 212. Transistors 211 and 212 communicate across taps 201 and 202 with the cable 20.

While designated by separate numerals, the structure of stations 225 and 226 can be similar to either station 125 or station 126. Stations 125 and 126, however, are distinct only in the manner of obtaining signal "r". In station 126 the using device 128 comprises a general purpose computer which therefore can perform internally the weighting and random number generation functions. Station 125 is intended to comprise a microprocessor, for example, as the using device 127 and therefore requires the additional logic shown in stage 115. Stations 225 and 226 may connect any other using device including devices having internal capability similar to device 128. Thus the internal structure of stations 225 and 226, and particularly the structure of the interface stages 215 and 216 therein, is either similar to station 125 or to station 126, depending on the using device.

Proximate the intersection of cables 10 and 20 there is a repeater circuit generally designated by the numeral 50 communicating on one side between a tap 103 on cable 10. On the interior of the repeater 50, the center lead of tap 103 is tied to a transceiver 243 across a repeater logic section 60 to a transceiver 245 which then connects to cable 20 by way of a tap 203. In this manner, a communicating network is formed by which two network segments, or cables 10 and 20, are tied together across repeater 50 which matches up the signals between the cables.

While stations 125 and 126, and 225 and 226 are shown without additional restrictions, the further aspects of the invention are that communications can take place between unequal using devices therein. For that reason, device 128 symbolically represents a general purpose computer while device 127 represents a microprocessor. Device 227 may, for example, represent a remote console, while device 228 represents an auxiliary memory.

With these exemplary devices, microprocessor 127 typically entails a lower packet size while the auxiliary memory 228 normally entails large packet sizes transferred across interface stage at relatively low rates. Station 126, incorporating a general purpose computer device 128, on the other hand is capable of accepting and transmitting large data packets at relatively large rates. The remote console station 225 is interfacing directly with a person on the other side and therefore requires the lowest data transfer rates.

TRANSCEIVER

With the foregoing general description of the inventive system, a more specific description is now taken up of the various sections thereof. It is noted that while there are various data rates associated with each using device, the transceiver associated with each station is effectively decoupled from such data rates by the interface stage and therefore is essentially independent in its rate from the station. More specifically, by conventional design practices, each transceiver 111, 112, 211 and 212 is constructed to approximately match the bandpass characteristics of the cable itself.

The structure of transceivers 111, 112, 211 and 212 is therefore essentially identical for the above reasons and the description of one is therefore common to all of the transceivers. Thus, in FIG. 2 transceiver 111 is illustrated, it being understood that all other transceivers conform to the same description.

Figure 2:
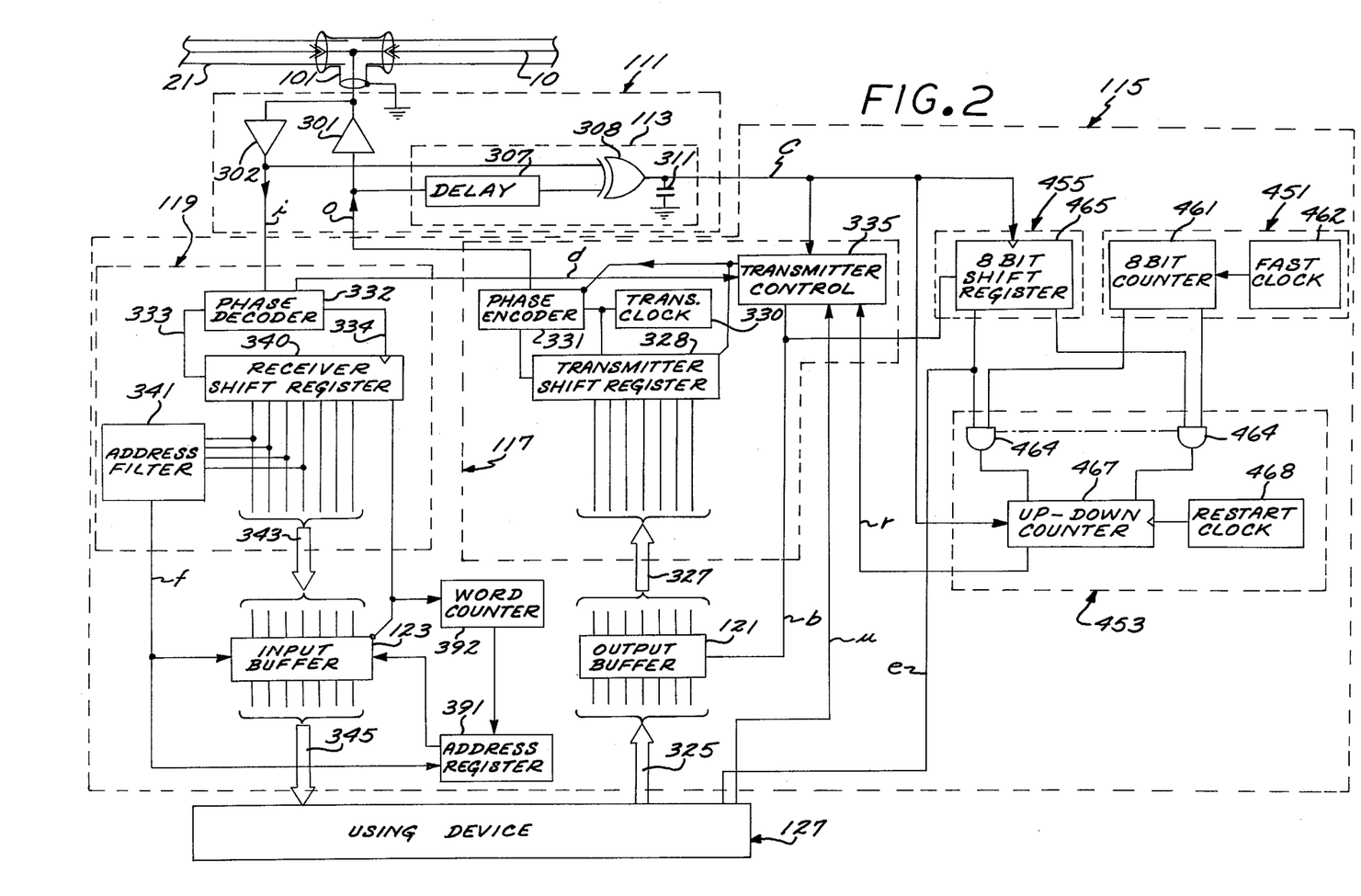
FIG. 2 is a block diagram illustrating one implementation of a transceiver and interface stage adapted for use with the system described in FIG. 1.

As previously described, transceiver 111 includes the transmitter or driver 301 and the receiver 302. Driver 301, at its output, is connected to the center lead of tap 101. On the input side, the driver receives serial data on the signal lead "o" from the associated interface stage 115.

Also included in the transceiver 111 is the aforementioned collision detector 113. Collision detector 113 includes a delay circuit 307, which may take the form of a delay line segment, delay circuit 307 connecting between the signal lead "o" and one input terminal of an exclusive OR gate 308. The other input terminal of gate 308 connects directly to signal lead "i". Thus, by appropriately matching the delay time constant with the switching delays of the driver 301 and the receiver 302, the exclusive OR gate 308 will receive nearly identical input signals at both terminals if no other data is present on the cable. When the input signals to gate 308 cease to be identical, a data collision is detected during the instances of inequality. Gate 308 therefore checks for collisions, providing the output signal lead "c" which upon turning high indicates a collision. In order to filter various high frequency noise components from triggering a collision, signal lead "c" is tied to ground by a capacitor 311.

While the above description of the inventively modified transceiver functionally calls for circuit or chip elements which are essentially conventional, one other implementation thereof is further disclosed hereinbelow. As a further note, it is hereby observed that although the implementing circuits disclosed herein are considered to be successful implementations, other chip selections are possible. In particular, it is noted that the transceiver switching rates have been chosen for interfacing simplicity. A slower rate would be insufficient to carry anticipated network loads and a faster rate would require larger and expensive input/output buffers. The chosen rate determines the selection of chips having either higher or lower switching rate capabilities. For the purpose that the present invention is utilized, the peak bandwidth of the cable is roughly three million bits per second. Accordingly, the alternative embodiment shown below includes elements having appropriate switching times.

INTERFACE STAGE

It is noted that interface stages 115, 116, 215 and 216 each interface a relatively high bandwidth communication network with devices which are either of high or low bandwidth themselves. Accordingly, each interface circuit, by necessity, requires buffering features and a clock in order to transform the data rate available from the particular device to a data rate which approximates the data rate capacity of the network itself. The general description of these matching features is shown by way of the further logic in FIG. 2.

Signals "i", "o" and "c" from transceiver 111 are in turn connected to the interface stage 115. Interface stage 115 includes the above-mentioned transmitter and receiver logic stages, respectively 117 and 119, which interface across the associated buffers with the using device 127.

Device 127 is shown generating data in parallel form by way of a data output bus 325. Data bus 325 inputs to the buffer 121, shown by way of a conventional buffer register, which in turn outputs, again by way of a parallel data bus 327, to the transmitter stage 117 wherein it is connected to the data terminals of a transmitter shift register 328. A clock 330 shifts the data out of the shift register 328 in serial form to a phase, or data-clock, encoder 331 which is further described hereinbelow. Encoder 331 in turn provides the bit-serial stream on signal lead "o" to driver 301. Shift register 328 and encoder 331 furthermore are enabled by a transmitter control circuit 335, to be further described, which combines the signal lead "c" with several other signals.

Specifically, collected with signal "c" in transmitter control circuit 335 is a signal "u" which originates within the using device 127, allowing for selective or external control over the transmissions. Also, a buffer signal "b" is connected thereto from buffer 121. Signal "b" is a two-way signal, indicating in one direction that the buffer is ready to transmit and in the other direction the command for transmission of the next word in the buffer.

On the input side, signal "i" connects, from the transceiver 111, to a phase, or data-clock, decoder 332. Decoder 332 then transmits two separate signals, i.e., a serial data signal 333 and a received clock signal 334. Signal 334 is connected to the clock terminals of a receiver shift register 340 which on its more significant bit positions is connected in parallel to an address filtering circuit, or a decoder, 341. Thus, as the data is serially shifted in into the shift register 340, a particular coded combination of the address leader appears at one point in time on the more significant bit terminals of the shift register which when meeting the decoding requirements of decoder 341 identifies whether this particular set of data is addressed to this particular station. When a proper address is thus identified in the first word of a packet, decoder 341 generates a signal "f" which enables buffer 123 to accept the parallel data on a bus 343, from register 340, for the first word and all subsequent words in the packet. The highest bit position of register 340 is connected to strobe the buffer 123. Thus, as the data words are advanced through the shift register, when the highest bit position is reached the contents of the shift register are transferred to the buffer 123. Buffer 123 then outputs on a parallel lead bus 345 to the device 127.

One additional function of the data-clock decoder 332 is to generate a cable busy signal, or signal lead "d", to circuit 335. More specifically, the data-clock decoder 332, conventionally with every transmission sensed, identifies the clock from the data on the cable. The presence of a clock rate therefore is indicative of other data transmissions presently carried on the cable. This clock signal is brought out as the signal "d" to the control circuit 335 which then controls the transmission.

By way of the foregoing description, an inventive system is disclosed wherein a single channel network comprising cables transmits data packets between various communicating stations. For example, station 125 in FIG. 1, which includes a microprocessor, periodically requires the services of an auxiliary memory located at station 225. Thus a request is sent in the form of a data packet from station 125 to station 225, broadcast into the cable. The addressing, or the routing, of the data packet between station 125 and station 225 is performed by way of the address filtering circuit provided therein. Both cables 10 and 20, at that instant of time, will carry the serial contents of the requesting data packet. If within the time interval that it takes the data packet to propagate from tap 101 to another tap, as for example the tap 202, station 226 elects to communicate also, two data packets will simultaneously exist on the same cable. In each station the transceiver circuit, by way of the exclusive OR gate 308, will therefore identify a data packet collision. When such a collision is identified, both sending stations immediately cease their transmissions.

Furthermore, each transceiver is limited in its transmissions by the signal lead "d" which will block inputs to driver 301 whenever other data is presently communicated along the cables. This feature identified hereinabove as deference is fixed in every interface stage and therefore every station will defer to existing communication. Thus, it is only during the quiescent periods on the cable that colliding data packet transmissions can be initiated. Where cable length is large and therefore the propagation or the delay times of packet propagation along the cable are large, the incidence of contemporaneous transmission start ups increases. Thus, packet collision is significant statistically to any large system. In the case that two transmissions are being deferred for a third, when the third transmission completes, the two will immediately collide, abort, and retry until one is able to acquire with the other deferring.

Each transceiver is coupled to generically similar devices, i.e., either microprocessors or general purpose computers, which operate in time domains that are similar. Thus, after a collision is identified by way of the exclusive OR gate 308 and all sending stations defer, a normal restart would occur at some integer value of their internal clocks. Since those clocks are very often similar, the simultaneous restart, or a restart within the delay time of cable propagation, would again collide. Thus, repeated collisions can occur within a system communicating over relatively long cables connecting similarly structured devices.

In order to avoid the possibility of repeatedly colliding transmission restarts, there is provided in the interface stage 115 the above-described random number generator 451, collision counter 455 and weighting circuit 453 which combine to statistically coordinate retransmissions.

While there are many techniques for performing the functions of coordinated retransmission, one particular arrangement adapted for use with the present invention is shown by way of the additional logic in FIG. 2. More specifically, generator 451 is formed by an 8-bit counter 461 which is clocked by a fast clock 462 operating at rates much faster than any other clock in the system. Thus, counter 461 runs as a continually running clock counter. The eight data outputs from counter 461 are connected to one of the terminals of a corresponding set of eight AND gates 464 forming the input side of the weighting circuit 453. The other input terminals of AND gates 464 receive the data outputs of an 8-bit shift register 465 forming the collision counter 455. Shift register 465 is clocked by the signal "c" each time a collision occurs and the serial input thereof is, in turn, connected to the signal "b". Thus shift register 465 counts up the number of collisions occurring during those times when a packet is ready for transmission.

The outputs of gates 464 are connected to the data inputs of an up-down counter 467 which is clocked by a restart clock 468 and which is loaded by the signal "c" to begin a down count. When the count reaches zero, a signal "r" is sent to the transmitter control 335 to initiate retransmission of the data packet.

In addition to the above structure, the most significant data bit from shift register 465 is brought out as an error signal "e" which is returned to the using device to indicate an abnormal condition.

The above description of the retransmission logic in stage 115 provides an external implementation of a function which may be carried out, in various alternative forms, internally within the using device itself. In the communicating arrangement shown in FIG. 1, using devices 127, 227 and 228 are all devices with limited data processing capability. Device 128, however, is a general purpose computer which therefore can take on the functions of generator 451, circuit 453 and counter 455. The internal implementation of these functions, however, is necessarily adapted to the mode of operation of the computer itself, and will therefore vary from the implementation shown in FIG. 2.

Accordingly, the general structure of the interface stage shown in FIG. 2 is typical of the interface stages 115, 215 and 216. Interface stage 116 is shown separately in FIG. 3.

Figure 3:
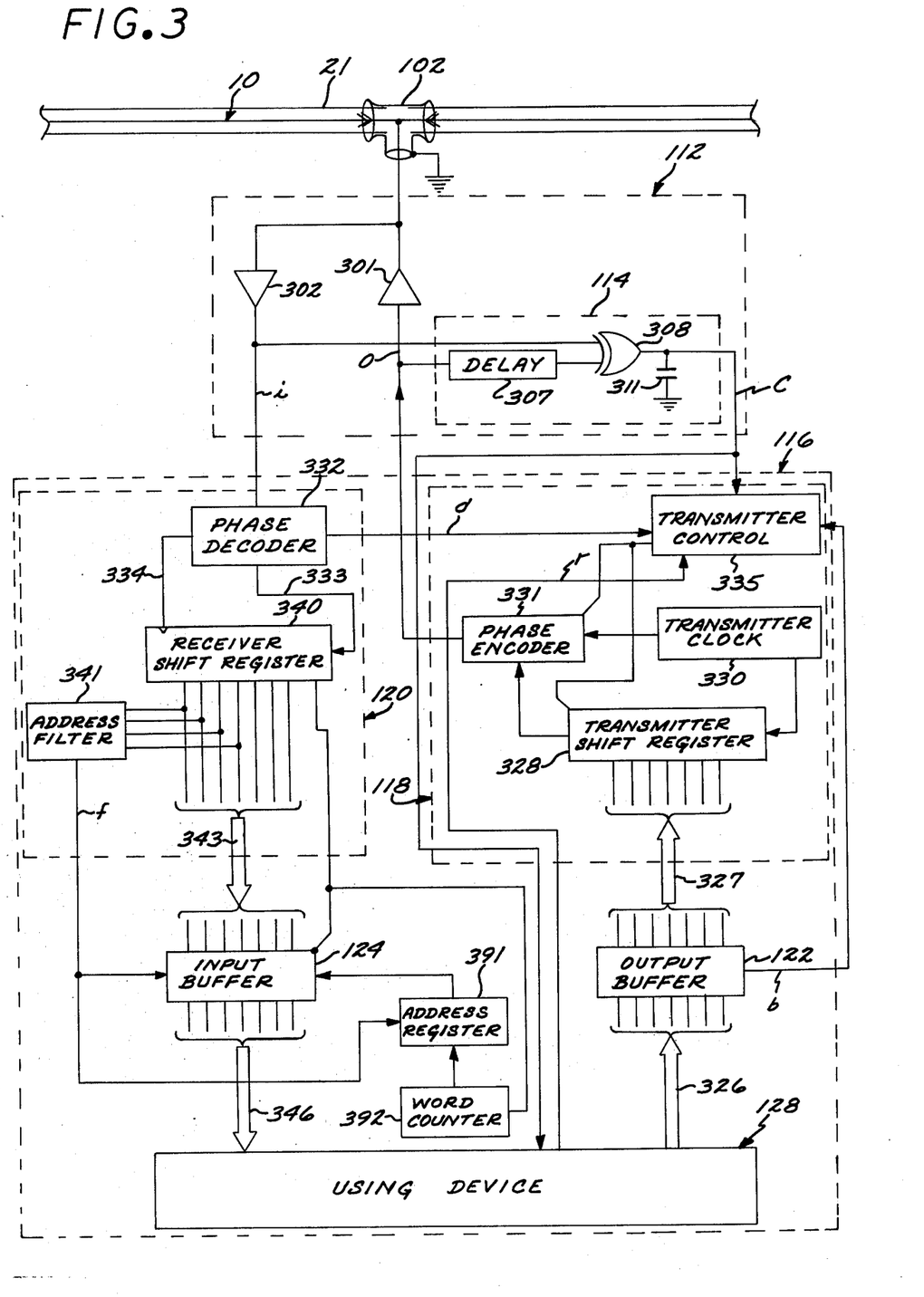
FIG. 3 is a block diagram illustrating yet another implementation of said transceiver and interface stage adapted for use with the system described in FIG. 1.

As shown in FIG. 3, interface stage 116, behind transceiver 112, similarly includes a receiver logic stage 120 which is tied on one end to the signal lead "i". On the other end stage 120 communicates across an input buffer 124 with the using device 128, shown as a general purpose computer. While there are many computer configurations, the most typical ones generally all contain a central data bus comprising a plurality of parallel data leads tied to the input buffer 124 by way of a data input bus 346. The output buffer 122 is similarly tied by the bus 327 to the transmitter 118 and to device 128 by a bus 326.

The implementation of the receiver stage 120 is substantially identical to the receiver stage 119 in FIG. 2. For that reason, like numerals are used for like components thereof. Accordingly, signal lead "i" is once again received at the input of the phase decoder 332 which at its output provides signals 333 and 334 to the receiver shift register 340. The parallel outputs of shift register 340 are again tied to an address filter 341 and to the data bus 343.

On the transmitter side, transmitter logic stage 118 again includes control 335, phase encoder 331, transmitter clock 330 and the transmitter shift register 328 connected in a manner similar to stage 117. Signal "r", however, originates at the using device 128 which also receives signal "c".

While there are many possible ways of implementing the randomized retransmission feature, one alternative implementation thereof is by way of a subroutine incorporated within the communicating computer device. Since such randomization would necessarily have to be local, only those communicating stations which have processing capability could implement such by way of a subroutine. Stations including devices like a remote console or the auxiliary memory station are better served by the hardwired system described above for the same function. Accordingly, two manners of accomplishing the randomization of the retransmission incidents are shown herein.

Figure 4:
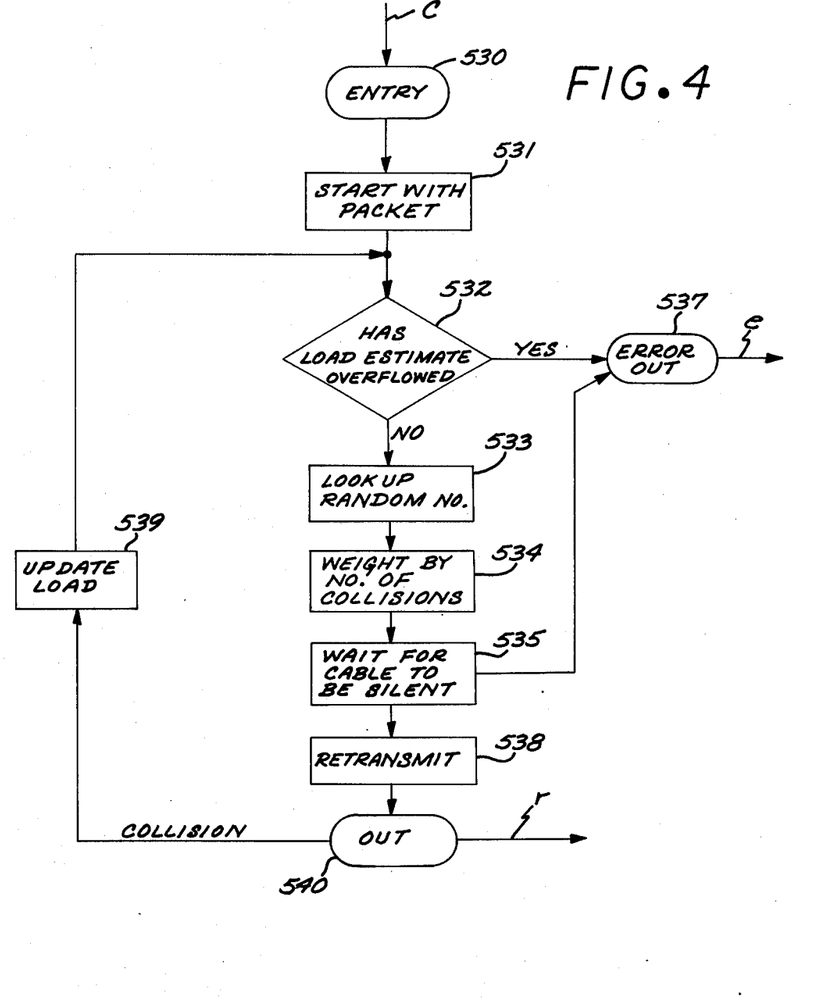
FIG. 4 is a flow chart of a computer program operating in a manner of a random number generator adapted for use with the interface stage illustrated in FIG. 3.

A general description of such a subroutine is shown by way of FIG. 4, wherein a flow chart is illustrated which can be specifically implemented in any general purpose device by those "skilled in the art." The subroutine is called and started through entry 530 by signal "c". The routine starts with step 531 identified as a data input block "start with packet" corresponding to each packet, which identifies that there is a packet at the output registers of the station which is ready for transmission. The next step in sequence is a conditional branching step 532 which checks the number of attempts made for each packet, similar to the function of signal "e". The number of collisions previously having occurred is thus tested in step 532 to see whether the total number of failures has exceeded a preselected number, and if exceeded the error signal "e" is generated on output 537. If the total number has not been exceeded, branch instruction 532 flows down to a step 533.

Step 533 performs a random number look up, selecting the next number in a random number series in a manner similar to random number generator 451. The random number generated by step 533 is then entered into a weighting step 534 which performs a weighted mean sequential count down similar to weighting circuit 453.

When the random number is counted down to zero, or when step 534 is completed, the local station is ready to retransmit. This occurs in the step, or instruction, 535 which essentially waits for the cable to be silent by looking at signal "d". This instruction is again a branched instruction and if the cables are not silent within a selected interval, the above sequence should not be followed. Accordingly, there is a time-out function included in step 535 which, if exceeded, indicates a system failure through output 537. Similarly, step 532 indicates a system failure if a load estimate has been exceeded. Both branch instructions therefore are pulled out on an indicator panel to alert the operator of the system. In the alternative, in step 535 if the cable goes silent within the time-out function, the driver is opened and the transceiver is therefore ready to transmit the packet by executing step 538. While the packet is transmitted, there is concurrent monitoring by way of the OR gate 308 and if a collision is detected during the transmission of the packet, the load is updated in step 539 and the loop is returned to the juncture between steps 531 and 532. If no collision is detected, a packet transmission is completed by output 540.

SELECTED IMPLEMENTATION

With the foregoing description of the inventive system, selected sections thereof are now described in terms of integrated circuit chips. Thus, devices like the receiver shift register 340 may be formed by combining various chips to obtain the desired bit level outputs and the selection thereof including the bit capacity is therefore wholly within the options of the designer. Similarly, buffers 121 and 123 depend on the input and output bandwidths and data rate of the using device, and are therefore again within the design selection of one "skilled in the art."

Figure 5:
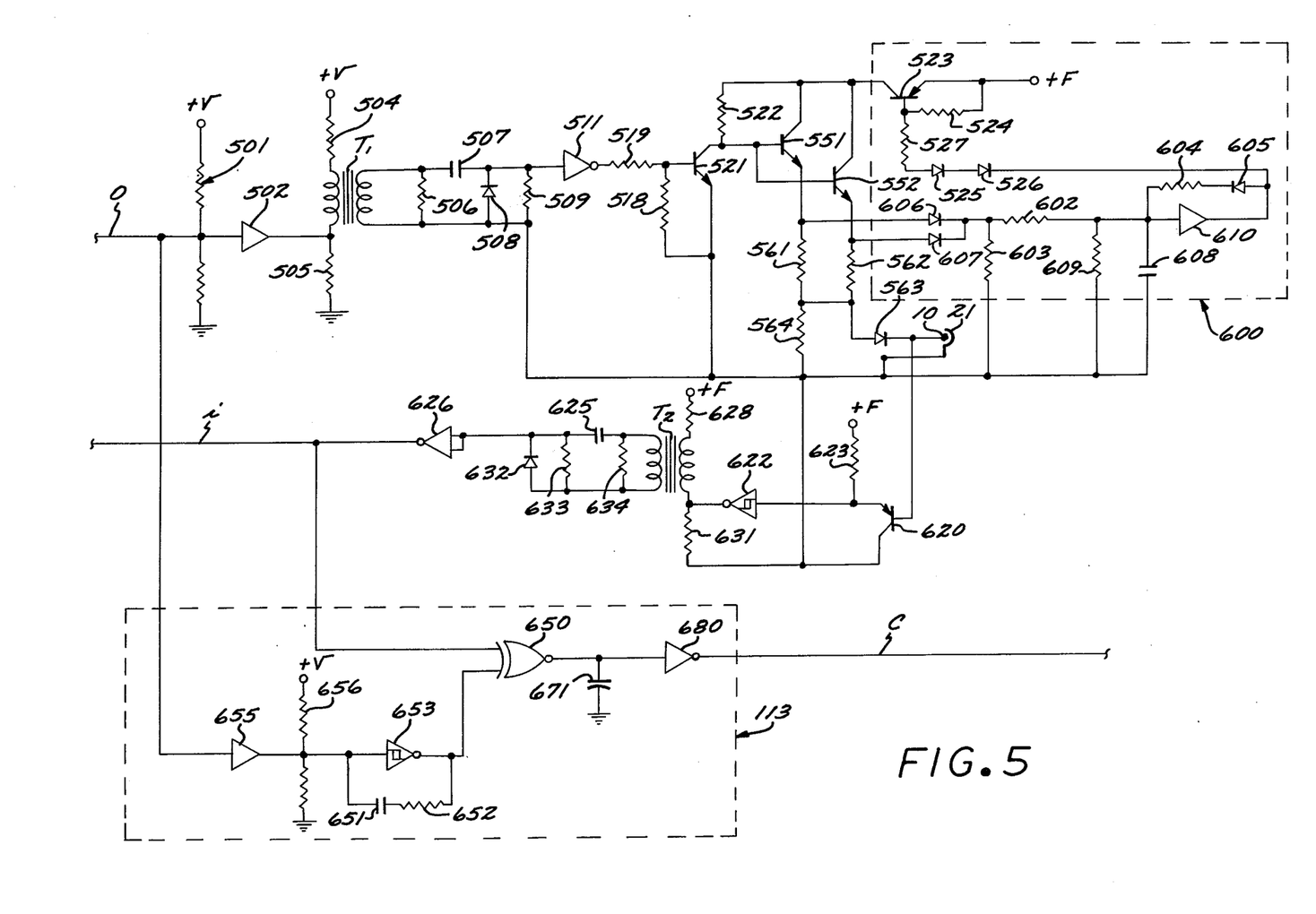
FIG. 5 is a circuit schematic illustrating one practical implementation of a transceiver adapted for use with the block diagrams shown in FIGS. 2 and 3.

FIG. 5 illustrates one implementation of the transceiver 111 which, in addition to the above functions, provides isolation between the cable and the local station. Thus, a local failure will not damage the cable and any other communicating devices tied thereto. The local ground for each station is furthermore isolated from cable ground to provide complete isolation of the cable.

More specifically, the signal lead "o" is tied to the division point of a terminating network formed by a voltage divider 501 tied between a signal +V and ground. That same division point is tied to drive a line receiver 502 which at its output connects to one end of the primary of a transformer T1. The primary of transformer T1 is also tied between signal +V and ground at both ends across resistors 504 and 505 to load the receiver 502. It is to be noted that ground for voltage divider 501 and resistors 504 and 505 are all station local grounds and are therefore hereinafter referred to as station grounds.

The secondary of transformer T1 is in turn referenced to the cable ground at one end. A resistor 506 is tied across the secondary to provide the terminating load thereacross. Connected to the high side of the secondary is a D.C. restorer circuit comprising a coupling capacitor 507 tied to the cathode of a diode 508 which at the anode connects to the cable ground, diode 508 being shunted on the other side by a resistor 509. This circuit arrangement provides for transformer isolation between the station and the cable to protect the cable from local failures.

The output of the D.C. restorer circuit, or the high side of the resistor 509, drives an inverter 511. The output of inverter 511 then drives the base, across a base resistor 519, of an NPN transistor 521 connected in common emitter circuit to cable ground. Transistor 521 is connected in common emitter mode to the cable ground, including a collector load resistor 522 and a base circuit comprising a resistor 518 connected across the base-emitter junction. The collector output of transistor 521 drives the bases of two emitter follower transistors 551 and 552. Transistors 551 and 552 are directly tied to the top end of resistor 522 at their collectors, transistor 551 connecting to an emitter circuit comprising a series connection of resistors 561 and 564 tied to cable ground. An emitter load resistor 562 is tied between transistor 552 and the junction between resistors 561 and 564. The signal developed across resistors 564 is then connected, across a protection diode 563, to the cable 10.

In addition to the above functions, a cable protection circuit 600 is provided, tied to the emitters of transistors 551 and 552 across corresponding diodes 606 and 607. Diodes 606 and 607 are tied in common at their outputs, or at their cathodes, to one end of resistors 602 and 603. Resistor 602 connects at the other end to the top side of a capacitor 608, capacitor 608 and resistor 603 tying to cable ground at the other ends. Capacitor 608 includes a shunt resistor 609 setting its discharge rate. The charge developed on capacitor 608 is then connected to the input of an amplifier 610 which includes a feedback loop comprising a diode 605 and a resistor 604. Thus when the turn on threshold of amplifier 610 is reached the amplifier circuit is latched on. The output of amplifier 610 then connects to the cathode of a diode 526 connected in series with a diode 525 and resistor 527 to the base of a PNP transistor 523. The collector of transistor 523 is tied to the upper end of resistor 522 while the emitter thereof is tied to the floating signal source +F and to a base biasing resistor 524.

Thus, if either transistor 551 or 552 is on for an excessive period, relative a bit interval, the OR gate formed by diodes 606 and 607 will charge up capacitor 608 to a signal level latching on the amplifier 610. Amplifier 610, once latched on, turns off transistor 523 pulling transistors 551 and 552 off the line. In this manner an inoperative transmitter stage is pulled off the line.

The input to the station is developed by connecting again a PNP transistor 620 to the cable 10 by its base and to the cable shield 21 by its collector. The emitter of transistor 620 is connected again in an emitter follower circuit both to one input of a Schmitt trigger inverter 622 and across a resistor 623 to the isolated, or floating, signal +F. The output of inverter 622 then connects to one end of the primary of a transformer T2 connected between signal +F and cable ground across load resistors 628 and 631 in a manner similar to transformer T1, the secondary thereof again driving a D.C. restorer circuit including a coupling capacitor 625 between resistors 633 and 634 and a diode 632. Capacitor 625 then connects to the inputs of an inverting line driver 626 which produces the signal "i".

Thus transformers T1 and T2 effectively isolate the cable from the station, the cable driver section being furthermore powered by a floating power supply.

In order to provide the function of the collision detector 113, the output of driver 626, or signal "i", is furthermore connected to one input of an exclusive NOR gate 650. Signal "o" in turn drives a buffer 655, terminated by a network 656, which in turn drives a Schmitt trigger buffer 653. Buffer 653 includes a series circuit comprising a capacitor 651 and a resistor 652 in feedback which together delay signal "o" by a delay constant equal to propagation delay of signal "o". The output of buffer 653 is then tied to the input of the NOR gate 650. NOR gate 650 at its output is connected to ground across a capacitor 671 and to an inverting line driver 680 which produces the signal "c".

While all of the circuit elements referred to above are conventional, in order to assist one skilled in the art, the following list of chip models can be incorporated when practicing the invention and obtained from Texas Instruments, Inc., P.O. Box 5012, M.S. 84, Dallas, Texas 75222:

| Schmitt trigger buffers | SN75140 |
| Line drivers | SN7438 |
| NOR gate | SN74LS266 |

Figure 6:
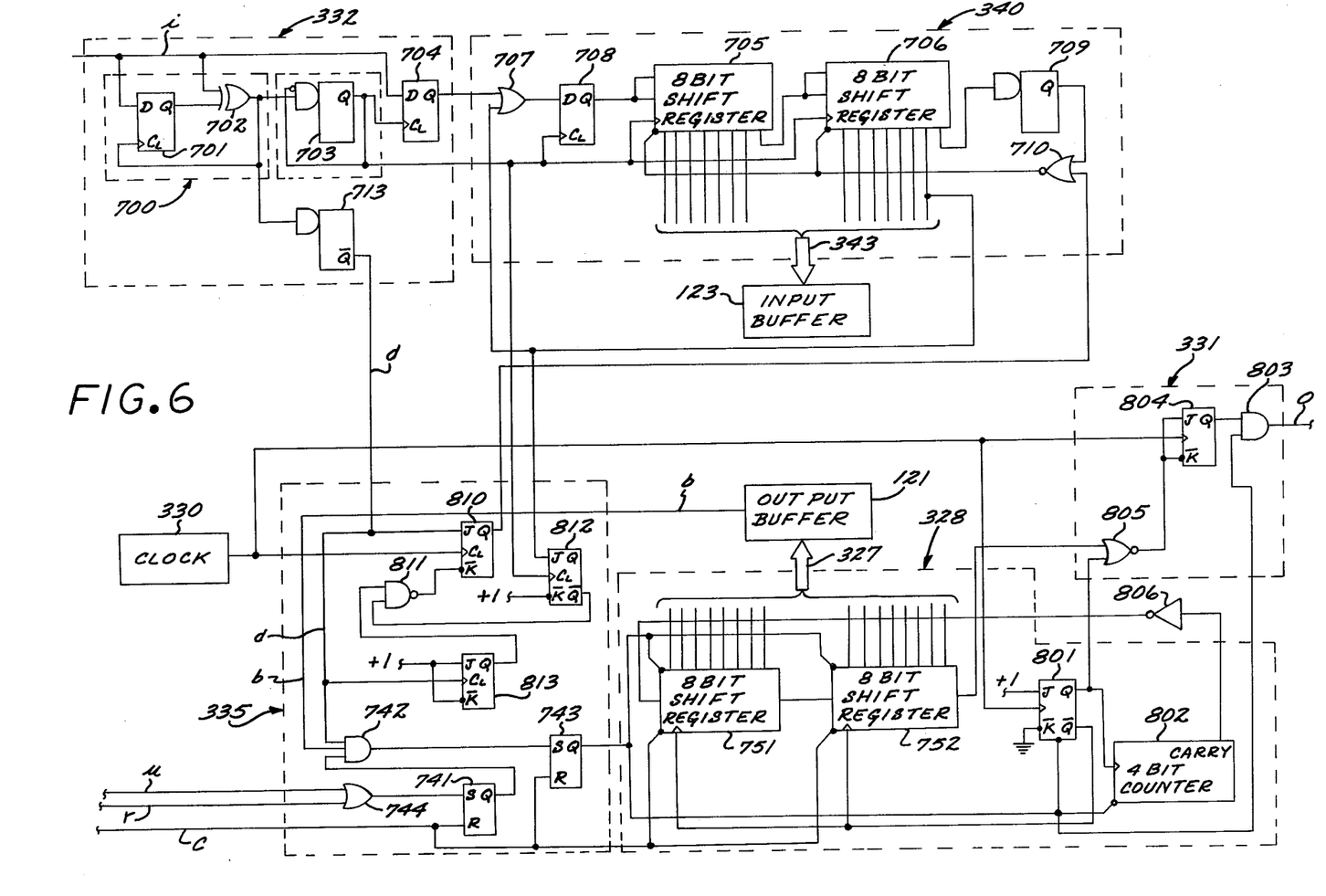
FIG. 6 is a circuit schematic illustrating one practical implementation of the interface stage useful with the block diagrams shown in FIGS. 2 and 3.

The selected implementations of the elements of the interface stage 115 are shown in FIG. 6. It is noted that while the elements of stage 115 can be implemented by conventional techniques, the detail implementation depends on the code used and is therefore subject to design choice of one skilled in the art. In addition, many other functions, like parity checking or error checking, and various logical packet sequencing arrangements may be desired when applying this invention to a specific use.

In FIG. 6 signal "i" from transceiver 111 is connected to the D input of a D-type flip-flop 701 forming the front end of a transition detector 700, and is also fed to an exclusive OR gate 702, flip-flop 701 and gate 702 comprising the input sections of the phase decoder 332. The output of gate 702 is fed back to the clock input of the flip-flop 701. The other input of gate 702 is the Q output of flip-flop 701, resulting in a short, positive pulse of a duration equal to the propagation delay of flip-flop 701 and gate 702 for each transition on the signal "*i*". The output of gate 702 is furthermore tied to the high level, or B, input of a monostable multivibrator, or one-shot, 703 forming a clock recovery circuit 730. Multivibrator 703 can be a Model SN74123 one-shot, as produced by Texas Instruments, Inc., P.O. Box 5012, Dallas, Texas. The Q output of the one-shot 703 is fed back to the low level, or A, input thereof to prevent retriggering once triggered. The Q output of the one-shot 703 is furthermore connected to the clock input of yet another D-type flip-flop 704 which again is tied by its D inputs to the signal "*i*". Detector 700, recovery circuit 730 and flip-flop 704 thus form the phase decoder 332. The output of gate 702 further connects to a similar one-shot 713 which at its Q output provides the signal "*d*". One-shot 713 is retriggered conventionally before going low by the transition train from gate 702. Flip-flop 704, therefore, operates as the input stage to the shift register 340.

Shift register 340 may comprise two series connected shift registers 705 and 706, such as Model No. SN74164 shift registers, again by Texas Instruments, Inc., having the Q output of flip-flop 704 collected with the second most significant bit level of shift register 706 at the inputs of an OR gate 707 which by its output drives the D input of a flip-flop 708. The clock to flip-flop 708 is again the Q output of one-shot 703. Thus, the function of flip-flop 708 is to recycle a mark bit while shift registers 705 and 706 are being cleared in preparation for the next word. At the completion of each word the most significant bit of shift register 706 is recirculated to trigger yet another similarly constructed one-shot 709 which in turn is returned to clear both shift registers 705 and 706. The second most significant bit of shift register 706, in addition to the above connections, strobes the data from the shift register to the buffer 123.

On the output side, output buffer 121 periodically loads, in parallel, the transmitter shift register 328 under the commands from the control 335. In specific illustration, control 335 includes an S-R flip-flop 741 as its input stage, receiving at the S input, across an OR gate 744, a pulse signal "*u*" from the using device indicating that the device is ready to transmit, or the "*r*" signal. The R, or the reset, input of flip-flop 741 is driven by signal "*c*" from transceiver 111, indicating a collision. Flip-flop 741 outputs from its Q output to one input of an AND gate 742 which collects, in addition thereto, signals "*b*" and "*d*". Gate 742 in turn drives the set, or S, input of yet another S-R flip-flop 743 reset by the signal "*c*" in a similar manner, and the Q output of flip-flop 743 enables shift register 328 and phase encoder 31. Thus the Q output of flip-flop 741 indicates the using station's desire to transmit and the Q output of flip-flop 743 indicates that all conditions for transmission are satisfied.

Shift register 328 is again shown by way of a specific implementation formed by a 16-bit series connection of two 8-bit Model No. SN74165 shift registers by Texas Instruments, Inc., respectively designated 751 and 752, which provide the parallel-to-serial conversion of sixteen bit words from the buffer by shifting out at a clock rate of clock 330.

The Q signal from flip-flop 743 is furthermore connected to the phase encoder 331 where it is received at the clear terminals of a flip-flop 801 and a 4-bit counter 802, such as a Texas Instruments, Inc. Model No. SN74161 counter. That same signal is also connected as one input to an AND gate 803 which generates the signal "*o*" at its output. The other input to gate 803 is the phase encoded data from shift register 328 by way of a phase encoding flip-flop 804 which is clocked by the transmitter clock 330 and receives a shift register serial output across a NOR gate 805. The other input to gate 805 is a data clock signal originating at the Q output of flip-flop 801 and therefore has a period twice that of the transmitter clock. Flip-flop 801 is a J-K operating as a toggle by virtue of the logical "1" at the J input and a logical "0" at the K input.

Shift register 328 is loaded in parallel from output buffer 121 when the carry output of counter 802 goes high to indicate that sixteen bits of data have been previously shifted out of the shift register. While generally described as an *n*-bit shift register, the series connection of registers 751 and 752 forms a 16-bit combination, each register requiring a low true load signal and therefore the carry output of counter 802 is inverted by an inverter 806. Flip-flops 801 and 804 and gate 805 form the phase encoder 331. In addition to the above functions, the carry output from counter 802 may be pulled off to conventionally advance the buffer to the next word. As has been previously stated, the selection of the buffer is particular to the data rate mismatch between the using device and the inventive communication system. Thus, the buffer can take many forms, including the form of the using device main memory and in such form the carry output from counter 802 would therefore provide the conventional function of a memory field pointer, selecting sequentially the next word. Where the device does not provide a main memory, external buffer or buffer registers may be provided. The sequence of field selection from an external buffer is again conventional and is described on Pages 12.80, 13.43 and 14.28 of *Digital Computer Technology and Design*, Vol. II, by Willis H. Ware, John Wiley and Sons, Inc., 1963.

Figure 7:
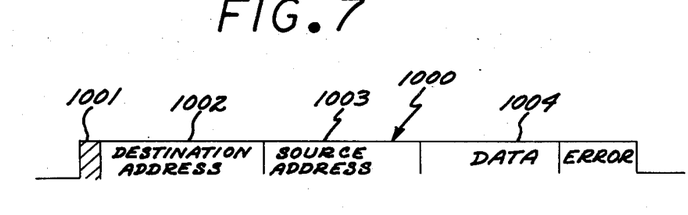
FIG. 7 is a signal wave form envelope illustrating a packet of data communicated by the present invention.

In FIG. 7, a bit stream chart is shown illustrating a data packet. While there are many codes possible, the use of Manchester code has been contemplated in the specific implementation of the encoder and decoder shown in FIG. 6. Accordingly, the packet, generally designated 1000, begins with a preamble in the form of either a single synchronization or mark bit 1001, or alternatively a string of bits as is conventionally practiced in the phase encoded magnetic tape art. Mark bit 1001 is followed by a series of bits 1002 designating the destination commonly referred to as an address leader. This address leader is then filtered by the address filter in order to permit transfer to the proper device. Behind the leader 1002 is a source bit series 1003 followed by a data bit series 1004. The source bit series, however, is not essential to the operation of the inventive system, providing only a convenient manner for identifying within the receiving using device the source or the originating address of the sending device. Data series 1004 may include, at the end thereof, various redundant error checks and information on linking of this data with subsequent data.

As one skilled in the art will observe, a longer preamble will allow for more sensitive transceivers by permitting gain control while in the preamble and will also provide that most collisions occur in the preamble.

The mark bit 1001 shown in the foregoing example is provided by presetting flip-flop 804 by again the Q output of flip-flop 743 which therefore will result in a ont bit preceding the transfer of data from the phase encoder.

Referring back to FIG. 6, signal "d", as produced by the one-shot 713, is connected to the J input of yet another J-K flip-flop 810 which is clocked by the clock 330 for convenience and receives at the K input the output of a NAND gate 811. Gate 811 collects the Q and the Q outputs respectively from flip-flops 812 and 813. Flip-flop 812 is again a J-K flip-flop receiving at the J input the second most significant bit from shift register 706 and is clocked by the output of one-shot 703. The K input is unused and is tied to a logical "1". Flip-flop 813 is similarly a J-K flip-flop connected as a D-type flip-flop and clocked by signal "d" from one-shot 713 to record the trailing edge of the carrier signal (or the rising edge of the Q output of one-shot 713).

Thus, flip-flop 812 records the receipt of an entire 16-bit word and therefore indicates that a packet, comprising more than one word, is in progress. The Q output of flip-flop 810 indicates the lack of the carrier signal and that the input shift register is ready to accept the next packet. If flip-flop 813 goes true before flip-flop 812 is true, then a packet less than sixteen bits has been entered into shift register 340. Such packet may result from incomplete transmissions due to collision and should be discarded. The discarding function is provided by the combination of NAND gate 811 clearing a flip-flop 810 which in turn clears shift register 340.

The latter description provides a convenient way for rejecting incomplete packets which are not translated to the most significant bit position in the shift register.

Within the buffer itself, the address register 391 and the word counter 392 maintain chronological order in a manner conventional in the art.

OPERATION

The inventive system is described above in conjunction with phase decoding and encoding features. One form of phase recording or coding is the non-return-to-zero coding as in the Ferranti or Manchester codes, described, for example, again in *Digital Computer Technology and Design*, Vol. II, Pages 12.26–12.27, by Willis H. Ware, John Wiley and Sons, 1963. The implementation shown in FIG. 6 shows encoding and decoding devices adapted for this purpose.

It is to be noted, however, that various other codes, including return-to-zero codes or double-frequency codes, may be used within the present invention. Accordingly, the structure of FIG. 6 is exemplary only, and no intent to limit the invention thereby is contemplated.

The bit-serial packet 1000 is sent on the cable until the leader 1002 thereof is properly identified by the address filter or decoder 341. Again, more than one code combination can be decoded in filter 341 and an arrangement whereby all receiving stations are addressed can be accommodated. In this manner various communication source-destination arrangements are accommodated by use of a single communicating medium or cable. When a destination is thus identified, the rest of the packet is transferred, in 16-bit words, to the input buffer. When the cable goes silent, as indicated by the absence of signal "d" at the most significant bit position of the receiver shift register an end of packet condition is identified. Any other absence of the carrier signal "d" indicates a packet failure. The register is then cleared.

Obviously, many modifications and variations of the present invention may be made with regard to the foregoing detailed description without departing from the spirit of the invention.

We claim:
1. A data communication system comprising:
a communicating medium;
a plurality of transceivers connected to said medium, each transceiver including transmitting means for transmitting a signal onto said medium, and receiving means for receiving a signal communicated on said medium by another transceiver;
collision detecting means coupled to the transmitting means and the receiving means of each transceiver for generating a collision signal whenever a signal communicated on said medium by another transceiver is received by said receiving means during the time said transmitting means is transmitting a signal onto said communicating medium; and
means connected to each transceiver and responsive to the presence of said collision signal for interrupting the transmission of a signal onto said medium by said transmitting means.

2. The data communication system of claim 1, wherein said collision detecting means is included in each transceiver.

3. The data communication system of claim 1, further comprising:
interface means connected to each transceiver, said interface means including said means for interrupting therein, and also including means responsive to the absence of said collision signal for transmitting an output signal to said transmitting means, and means responsive to the receipt of a signal by said receiving means for generating an input signal; and
using means connected to said interface means for supplying data thereto and receiving data therefrom.

4. The data communication system of claim 3, wherein said interface means further includes buffer means for generating said output signal and for receiving said input signal.

5. The data communication system of claim 1, further comprising:
signal detecting means coupled to said receiving means for generating a carrier signal whenever a signal communicated on said medium by another transceiver is received by said receiving means prior to said transmitting means transmitting a signal onto said communicating medium; and
means connected to each transceiver and responsive to the presence of said carrier signal for preventing the transmission of a signal by said transmitting means.

6. The data communication system of claim 5, further comprising:
interface means connected to each transceiver, said interface means including said means for interrupting and said means for preventing therein, and also including means responsive to the absence of said collision and carrier signals for transmitting an output signal to said transmitting means, and means responsive to the receipt of a signal by said receiving means for generating an input signal; and
using means connected to said interface means for supplying data thereto and receiving data therefrom.

7. The data communication system of claim 6, wherein said interface means further includes buffer means for generating said output signal and for receiving said input signal.

8. A system according to claim 4, wherein:

said medium is a bit-serial medium; and
said interface means includes a first shift register connected for bit-serial receipt of said input signal from said receiving means and for parallel output of said input signal to said buffer means, an address filter connected to selected parallel outputs of said first shift register for enabling the transfer of said input signal upon a preselected combination thereof, a second shift register connected for parallel receipt of said output signal for converting said output signal to a bit-serial output signal, and a transmitter clock connected to said second shift register for controlling the rate of said bit-serial output signal.

9. A system according to claim 8, wherein:
said collision detecting means includes an exclusive OR gate means connected at one input thereof to the output side of said receiving means and at the other input thereof across delay means to the input side of said transmitting means, said delay means providing a signal delay substantially equal to the signal propagation delays through said transmitting and receiving means, the output of said OR gate means providing said collision signal.

10. A system according to claim 7, wherein:
said medium is a bit-serial medium; and
said interface means includes a first shift register connected for bit-serial receipt of said input signal from said receiving means and for parallel output of said input signal to said buffer means, an address filter connected to selected parallel outputs of said first shift register for enabling the transfer of said input signal upon a preselected combination thereof, a second shift reigster connected for parallel receipt of said output signal for converting said output signal to a bit-serial output signal, and a transmitter clock connected to said second shift reigster for controlling the rate of said bit-serial output signal.

11. A system according to claim 10, wherein: said collision detecting means includes an exclusive OR gate means connected at one input thereof to the output side of said receiving means and at the other input thereof across delay means to the input side of said transmitting means, said delay means providing a signal delay substantially equal to the signal propagation delays through said transmitting and receiving means, the output of said OR gate means providing said collision signal.

12. A data communicating system comprising:
a bit serial communicating medium;
a plurality of transceivers connected to said medium, each transceiver including transmitting means and receiving means;
collision detecting means connected to said transmitting and receiving means for producing a collision signal when a signal produced by said transmitting means and a signal received by said receiving means are unequal;
interface means connected to said transmitting and receiving means to receive said collision signal and for transmitting an output signal to said transmitting means in the absence of said collision signal and for receiving signals from said receiving means to produce an input signal, said interface means including buffer means for producing said output signal and for receiving said input signal, a first shift register connected for bit-serial receipt of said input signal from said receiving means and for parallel output of said input signal to said buffer means, an address filter connected to selected parallel outputs of said first shift register for enabling the transfer of said input signal upon a preselected combination thereof, a second shift register connected for parallel receipt of said output signal for converting said output signal to a bit-serial output signal, and a transmitter clock connected to said second shift register for controlling the rate of said bit-serial output signal;
random number generating means operatively connected to said transmitter clock and including a fast clock for producing a random number signal according to the asynchronous relationship between said fast clock and said transmitter clock;
collision counting means connected to receive said collision signal for accumulating the repetition of said collision signal and for producing a count signal indicative thereof;
weighting means connected to receive said random number signal and said count signal for adjusting the mean value of said random number signal according to said count signal to produce an enabling signal to said second shift register; and
using means connected to transmit data to and receive data from said buffer means.

13. A system according to claim 12, further including:
overflow detecting means connected to receive said count signal for producing an error signal when said count signal exceeds a predetermined count.

14. A system according to claim 13, wherein:
said random number generating means includes a first counter connected to said fast clock;
said collision counting means includes a third shift register enabled by said buffer means and shifting out said collision signals;
said weighting means includes a plurality of first AND gates each receiving a selected signal from said first counter and said third shift register, an up-down counter loaded in parallel by the outputs of said AND gates and gated to count down by said collision signal; and
said overflow detecting means includes means connected to receive predetermined ones of the signals from said third shift register to produce said error signal.

15. A system according to claim 14, further comprising:
signal detecting means connected to the output of said receiving means for producing a carrier signal indicative of the presence of a signal on said medium; and
control means connected to receive said carrier, said collision and said weighting means output signals for preventing the transmission of said output signal in the presence of said carrier signal, for interrupting the transmission of said output signal upon the occurrence of said collision signal and for enabling said second shift register upon the occurrence of said weighting means output signal.

16. A system according to claim 15, further comprising:
isolation means included in said transceiver for isolating said interface means from said medium.

17. A data communication system comprising:
a bit-serial cummunicating medium;

a plurality of transceivers connected to said medium, each transceiver including transmitting means and receiving means;

collision detecting means connected to said transmitting and receiving means for producing a collision signal when a signal produced by said transmitting means and a signal received by said receiving means are unequal;

interface means connected to said transmitting and receiving means to receive said collision signal and for transmitting an output signal to said transmitting means in the absence of said collision signal and for receiving signals from said receiving means to produce an input signal;

said interface means includes a first shift register connected for bit-serial receipt of signals from said receiving means and for parallel output of said input signal to said buffer means, an address filter connected to selected parallel outputs of said first shift register for enabling the transfer of said input signal upon a preselected combination thereof, a second shift register connected for parallel receipt of said output signal for converting said output signal to a bit-serial output signal, and a transmitter clock connected to said second shift register for controlling the rate of said bit-serial output signal;

said interface means including buffer means for producing said output signal and for receiving said input signal;

random number generating means operatively connected to said transmitter clock and including a fast clock for producing a random number signal according to the asynchronous relationship between said fast clock and said transmitter clock;

collision counting means connected to receive said collision signal for accumulating the repetition of said collision signal and producing a count signal indicative thereof;

weighting means connected to receive said random number signal and said count signal for adjusting the mean value of said random number signal according to said count signal to produce an enabling signal to said second shift register;

overflow detecting means connected to receive said count signal for producing an error signal when said count signal exceeds a predetermined count; and using means connected to transmit data to and receive data from said buffer means.

18. A system according to claim 17, wherein:
said collision means includes an exclusive OR gate means connected at one input thereof to the output side of said receiving means and at the other input thereof across delay means to the input side of said transmitting means, said delay means providing a signal delay substantially equal to the signal propagation delays through said transmitting and receiving means, the output of said OR gate means providing said collision signal.

19. A system according to claim 18, wherein:
said random number generating means includes a first counter connected to said fast clock;
said collision counting means includes a third shift register enabled by said buffer means and shifting out said collision signals;
said weighting means includes a plurality of first AND gates each receiving a selected signal from said first counter and said third shift register, an up-down counter loaded in parallel by the outputs of said AND gates and gated to count down by said collision signal; and
said overflow detecting means includes means connected to receive predetermined ones of the signals from said third shift register to produce said error signal.

20. A system according to claim 19, further comprising:
signal detecting means connected to the output of said receiving means for producing a carrier signal indicative of the presence of a signal on said medium; and
control means connected to receive said carrier, said collision and said weighting means output signals for preventing the transmission of said output signal in the presence of said carrier signal, for interrupting the transmission of said output signal upon the occurrence of said collision signal and for enabling said second shift register upon the occurrence of said weighting means output signal.

21. A system according to claim 18, further comprising:
filtering means connected to said OR gate for smoothing the output thereof.

22. A data communication system comprising:
a bit-serial data communication system;
a plurality of transceivers connected for communication with said medium, each transceiver including transmitting means and receiving means communicating with said medium;
communication sensing means operatively connected to said receiving means for detecting the presence of communications on said medium and for preventing transmissions from said transmitting means to said medium upon detecting the presence of other communications on said medium;
collision detecting means connected to said transmitting and receiving means for producing a collision signal when a signal produced by said transmitting means and a signal received by said receiving means are unequal;
interface means connected to said transmitting and receiving means to receive said collision signal and for transmitting an output signal to said transmitting means in the absence of said collision signal and for receiving signals from said receiving means to produce an input signal, said interface means including buffer means for producing said output signal and for receiving said input signal, a first shift register connected for bit-serial receipt of said input signal from said receiving means and for parallel output of said input signal to said buffer means, an address filter connected to selected parallel outputs of said first shift register for enabling the transfer of said input signal upon a preselected combination thereof, a second shift register connected for parallel receipt of said output signal for converting said output signal to a bit-serial output signal, and a transmitter clock connected to said second shift register for controlling the rate of said bit-serial output signal;
random number generating means operatively connected to said transmitter clock and including a fast clock for producing a random number signal according to the asynchronous relationship between said fast clock and said transmitter clock;

collision counting means connected to receive said collision signal for accumulating the repetition of said collision signal and producing a count signal indicative thereof; and weighting means connected to receive said random number signal and said count signal for adjusting the mean value of said random number signal according to said count signal to produce an enabling signal to said second shift register; and using means connected to transmit data to and receive data from said buffer means.

* * * * *